(12) United States Patent
Tsuji et al.

(10) Patent No.: US 6,670,066 B2
(45) Date of Patent: Dec. 30, 2003

(54) SEPARATOR FOR FUEL CELL

(75) Inventors: Makoto Tsuji, Wako (JP); Masao Utsunomiya, Wako (JP); Teruyuji Ohtani, Wako (JP); Nobuhiro Saito, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 212 days.

(21) Appl. No.: 09/911,866

(22) Filed: Jul. 25, 2001

(65) Prior Publication Data

US 2002/0045086 A1 Apr. 18, 2002

(30) Foreign Application Priority Data

Jul. 25, 2000 (JP) .......................... 2000-223668

(51) Int. Cl.[7] .................. H01M 2/00; H01M 2/14; H01M 2/18
(52) U.S. Cl. ................ 429/34; 429/38; 429/12; 429/129; 429/146; 429/147
(58) Field of Search .................. 429/34, 38, 12, 429/129, 146, 147

(56) References Cited

U.S. PATENT DOCUMENTS 6,291,094 B1 * 9/2001 Yoshimura et al. .......... 429/34

FOREIGN PATENT DOCUMENTS

| JP | 59-141174 | 8/1984 |
| JP | 10-255823 | 9/1998 |
| JP | 2000-133282 | 5/2000 |

\* cited by examiner

*Primary Examiner*—Patrick Ryan
*Assistant Examiner*—Angela J. Martin
(74) *Attorney, Agent, or Firm*—Arent Fox Kintner Plotkin & Kahn

(57) ABSTRACT

A separator for a fuel cell comprises a plate-shaped electrode having a pair of gas diffusion electrode plates and an electrolytic layer held by the gas diffusion electrode plates. The separator being layered on both surfaces of the electrode and forming gas passages cooperating with the gas diffusion electrode plate. The separator comprising: a metallic plate; protrusions made from a material of the carbon type, the protrusion having a projected surface projecting from the metallic plate toward the gas diffusion electrode plate so as to contact therewith and to form the gas passages; and intermetallic compounds precipitated on the projected surface of the protrusion. The gas passage is formed by a surface of the metallic plate and a pair of side surfaces of adjoining protrusions.

5 Claims, 4 Drawing Sheets

SEPARATOR FOR FUEL CELL

BACKGROUND OF THE INVENTION

1. Technical Field

The present invention relates to elements for solid polymer electrolyte fuel cells, and relates to separators for forming gas passages in the fuel cells.

2. Related Art

In solid polymer electrolyte fuel cells, a separator is layered on both sides of a plate-shaped electrode to form a unit of the layered structure, and the plural units are layered to form a fuel cell stack. The electrode is a three-layered structure, in which a polymerized electrolytic membrane made from a resin such as ion-exchange resin is held by a pair of gas diffusion electrode plates (positive electrode plate and negative electrode plate). The separator is formed with gas passages for flowing a gas between the gas diffusion electrode plate. According to the fuel cell, hydrogen gas as a fuel is provided to the gas passages facing the gas diffusion electrode plate at the negative electrode side, and an oxidizing gas such as oxygen or air is provided to the gas passages facing the gas diffusion electrode plate at the positive electrode side, whereby electricity is generated by electrochemical reaction.

Conventional materials for separators can be classified approximately into the carbon type and the metal type. As materials of the carbon type, gas impermeable carbon in which a resin such as phenol is impregnated into a sintered isotropic carbon, an amorphous carbon in which a resin such as phenol is formed and baked thereafter, a composite formed material of a resin and carbon, and the like, are mentioned. As material of the metal type, high corrosion resistance metals such as stainless steels, titanium alloys, materials in which these metals are coated by noble metals such as gold or platinum, and the like, are mentioned. The above materials of the carbon type have superior characteristics, high corrosion resistance and excellent stability in environments of fuel cells, good electrical conductivity, and low electrical resistance. In contrast, the materials of the metal type have superior mechanical strength.

However, the materials of the carbon type and metal type have the following problems.

The gas impermeable carbon in materials of the carbon type is hard, and the gas passages are not easily formed by machining, thereby requiring much labor and expense. In the amorphous carbon, the sizes of products are not uniform since it contracts and deforms during baking. In a composite material of a resin and carbon, mechanical strength and impact strength are low, whereby cracks often occur in forming and assembling. In contrast, in the materials of metal type, since gas passages are formed by press forming, or the like, complicated and fine gas passages for obtaining the maximum generation efficiency cannot be easily formed.

SUMMARY OF THE INVENTION

Therefore, an object of the present invention is to provide a separator in fuel cells, which can satisfy the characteristics of the materials of the carbon type such as corrosion resistance and electrical conductivity and mechanical strength equipped by the materials of metal with high performance, and in which gas passages can be easily formed and manufacturing efficiency can be improved.

The present invention provides a separator for a fuel cell comprising a plate-shaped electrode having a pair of gas diffusion electrode plates and an electrolytic layer held by the gas diffusion electrode plates; the separator being layered on both surfaces of the electrode and forming gas passages cooperating with the gas diffusion electrode plate. The separator comprises: a metallic plate; protrusions made from a material of the carbon type, the protrusion having a projected surface projecting from the metallic plate toward the gas diffusion electrode plate so as to contact therewith and to form the gas passages; and intermetallic compounds precipitated on the projected surface of the protrusion. The gas passage is formed by a surface of the metallic plate and a pair of side surfaces of adjoining protrusions.

According to the separator of the invention, the metallic plate is a substrate, and in particular, the thin plate portion of the gas passage is formed by the metallic plate. Since stress is concentrated at the thin plate portion of the gas passage, the mechanical strength can be improved, and the structure can therefore be thin, light weight, and compact. Since the separator is impermeable to gas due to the metallic plate, reduction of the generating performance due to gas leakage can be prevented. The protrusion contacting with the gas diffusion electrode plate is formed from a material of the carbon type, so that the electrical resistance is small, and the electrical conductivity can be improved. Since the intermetallic compounds project from the metallic plate, the corrosion resistance thereof is improved. Furthermore, the protrusion is made from a material of the carbon type carbon, and the overall corrosion resistance can be improved.

As the metallic plate in the invention, for example, thin plates made from stainless steels, titanium alloys, or the like, are preferable. As materials of the carbon type, for example, expanded carbon, composite materials of the expanded carbon and a resin, composite materials of carbon and a resin, sintered carbon, amorphous carbon, composite materials of a carbon fiber, composite materials of a carbon fiber and carbon, or the like, are preferable.

The materials of the carbon type will be explained hereinafter. The expanded carbon is provided with flexibility by refining natural carbon as a raw material and subjecting it to an acid treatment, and then expanding it in the direction of the C axis (direction along the distance between the hexagonal faces of the carbon crystal) under high pressure and high temperature. The expanded carbon may be formed into the required shape by press forming, or the like. A composite material of the expanded carbon and a resin may be produced by mixing a binder resin such as phenol with the expanded carbon during press forming the expanded carbon. A composite material of carbon and a resin may be produced by mixing a powder of artificial carbon and a binder resin such as phenol and compressing and forming the mixture. The sintered carbon may be produced by mixing and press forming coke as a filer and pitch as a binder, and sintering it at a temperature in the range of 2000 to 2500° C., and then densifying it by repeatedly impregnating the pitch and sintering it. Amorphous carbon may be produced by forming phenol resin and baking it at a temperature of around 1500° C. The composite material of carbon fiber may be produced by compressing and forming a carbon material of a fiber with a carbon content of 90% by weight or more together with a binder such as phenol resin. The composite material of carbon fiber and carbon may be produced by sintering the composite material of carbon fiber at a temperature of 2000° C. or more.

The protrusion made from a carbon material and projecting from the metallic plate is secured to the metallic plate by various means. For example, the protrusion may be preformed and secured to the metallic plate by means of adhering or press adhering. Alternatively, a material powder of carbon type may be compressed or injected into the metallic plate so as to compact the protrusion, and it is then sintered so as to secure it to the metallic plate. In this manner, when a through hole for engaging the protrusion therewith is formed in the metallic plate, the securing strength of the protrusion with respect to the metallic plate is improved, and the electrical resistance is decreased and the electrical conductivity is improved. According to the forming method and the securing method for the protrusion, complicated and fine gas passages can be easily formed, and generating performance can be improved.

The protrusion secured to the metallic plate by the above manner contacts with the intermetallic compounds precipitated on the surface of the metallic plate. Since the intermetallic compounds have a low electrical resistance, the contact resistance is extremely low in comparison with the case in which the protrusion contacts with the matrix of the metallic plate. Therefore, the fuel cell demonstrates good electrical conductivity and high generation performance. As intermetallic compounds with low electrical resistance, carbides of the Fe—Cr type may be mentioned. Therefore, it would be very effective if the metallic plate is made from stainless steels and carbides of the Fe—Cr type are precipitated on the surface to which the protrusion is secured.

DETAILED DESCRIPTION OF THE INVENTION

An embodiment of the invention will be explained hereinafter with reference to the figures.

Figure 1:
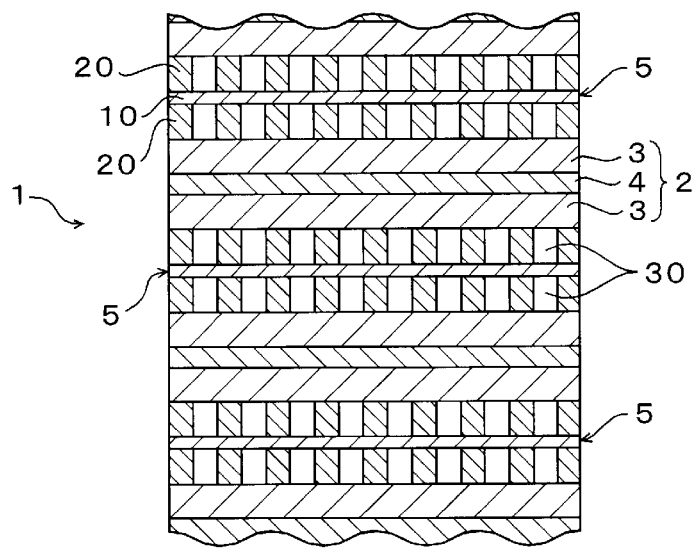
FIG. 1 is a vertical cross section of a fuel cell stack to which a separator of an embodiment of the invention is applied.

FIG. 1 is schematic view showing a layered structure of a fuel cell stack 1 which is a solid polymer electrolyte fuel cell including a separator according to an embodiment of the invention. In FIG. 1, reference numeral 2 is a plate-shaped electrode. The electrode 2 is a three-layered structure in which an electrolytic membrane 4 formed from an ion-exchange resin, and the like, is held by a pair of gas diffusion electrode plates 3 (positive electrode plate and negative electrode plate). A separator 5 according to the embodiment is layered on both surfaces of the electrode 2. The separators 5 and the electrode form a unit, and plural units are stacked so as to form the fuel cell stack 1.

Figure 2:
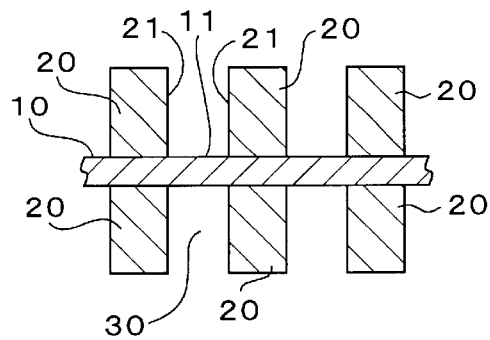
FIG. 2 is a partial enlarged cross section of the separator according to the embodiment of the invention.

As shown in FIG. 2, the separator 5 comprises a metallic plate 10 made from stainless steel and plural linear protrusions 20 projecting from both surfaces of the metallic plate 10 with spacing. The linear protrusion 20 is formed from expanded carbon and is secured to the surface of the metallic plate 10. A gas passage 30 like a groove is formed between the adjoining linear protrusions 20. The thickness of the metallic plate 10 is, for example, 0.15 mm. The thickness of the protrusion 20 is, for example, 0.6 mm. The metallic plate 10 is subjected to a heat treatment, and subsequently an acid treatment, so that intermetallic compounds consisting of the Fe—Cr type carbide are precipitated in both surfaces thereof and projects therefrom. The gas passage 30 is formed by the surface 11 from which the intermetallic compounds project and the side surfaces 21 opposing each other on the adjoining linear protrusions 20. The width of the gas passage 30 is, for example, 1 mm.

Figure 3:
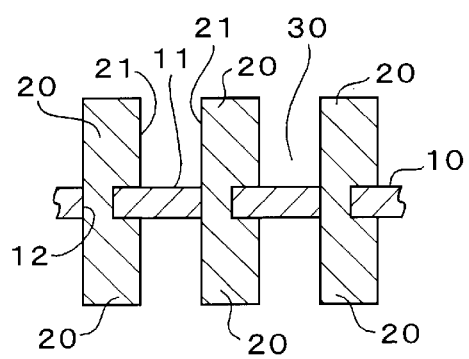
FIG. 3 is a partially enlarged cross section of an arrangement of the separator according to the embodiment of the invention.

The linear protrusion 20 is preformed and adhered to the metallic plate 10 by an adhesive. The adhesive is electrically conductive and has added thereto a carbon powder and/or metallic powder with low electrical resistance. The method for securing the linear protrusion 20 to the metallic plate 10 is not limited to the above manner. For example, a powder consisting of a material of the carbon type is compressed or injected to the metallic plate 10 so as to compact the linear protrusion 20, which is then sintered and connected to the metallic plate 10. In this manner, as shown in FIG. 3, through holes 12, with which a portion of the linear protrusion 20 engages, may be formed in the metallic plate 10, and a material of the carbon type as the portion of the linear protrusion 20 is embedded in the through hole 12. According to this structure, the linear protrusion 20 is rigidly secured to the metallic plate 10, and electric resistance is reduced and electrical conductivity is improved. According to the forming method and securing method for the linear protrusion 20, complicated and fine gas passages 30 can be easily formed, and the generation performance can be improved.

As shown in FIG. 1, the separator 5 is stacked such that the surface thereof is brought into contact with the surface of each gas diffusion electrode plate 3 with a predetermined pressure. Therefore, the gas passage 30 is actually formed by the surface of the gas diffusion electrode plate 3, the surface of the metallic plate 10, and the side surfaces 21 of the linear protrusions 20 therebetween.

In the separator of the embodiment, for example, hydrogen gas as a fuel is provided to the gas passages 30 facing the gas diffusion electrode plate 3 at the negative electrode side, and an oxidizing gas such as oxygen or air is provided to the gas passages 30 facing the gas diffusion electrode plate 3 at the positive electrode side, whereby electricity is generated by electrochemical reaction under the gas flow.

In the separator of the embodiment, the metallic plate 10 is a substrate, in particular, the thin plate portion of the gas passage 30 is formed by the metallic plate 10. Since stress is concentrated at the thin plate portion of the gas passage 30, the mechanical strength can be improved, and the structure can therefore be thin, light weight, and compact. Since the separator 5 is impermeable to gas due to the metallic plate 10, reduction of the generating performance due to gas leakage can be prevented. The linear protrusion 20 contacting with the gas diffusion electrode plate 3 is formed by expanded carbon, so that the electrical resistance is small, and the electrical conductivity can be improved. Since the intermetallic compounds project from the metallic plate 10, the corrosion resistance thereof is improved. Furthermore, the linear protrusion 20 is formed by expanded carbon, and the overall corrosion resistance can be improved.

Moreover, the linear protrusion 20 secured to the metallic plate 10 contacts with the intermetallic compounds precipitated on the surface of the metallic plate 10. The intermetallic compounds have a low electrical resistance, so that the contact resistance can be extremely small in comparison with the case in which the linear protrusion 20 contacts with the matrix of the metallic plate 10. Therefore, the fuel cell stack 1 demonstrates good electrical conductivity and high generation performance. In particular, since the intermetallic compounds in the embodiment are the Fe—Cr type carbide having extremely low electrical resistance, high electrical conductivity can be effectively obtained.

EXAMPLE

The advantages of the invention will be confirmed by examples of the invention.

Several kinds of stainless steels were subjected to two heat treatments (first and second heat treatment) and were subjected to an acid treatment thereafter, and metallic plates for separators of Examples 1 to 5 were obtained. The initial contact resistance and contact resistance after deterioration of the metallic plates were measured. The kinds of stainless steel, the conditions in the heat treatment and the acid treatment, and the resistances are shown in Table 1. As shown in Table 1, several kinds of stainless steels without acid treatment after heat treatment were obtained as metallic plates for separators of Comparative Examples 1 to 9.

steel, and to project the intermetallic compounds which were precipitated in the second heat treatment over a few $\mu$m from the surface.

Figure 4:
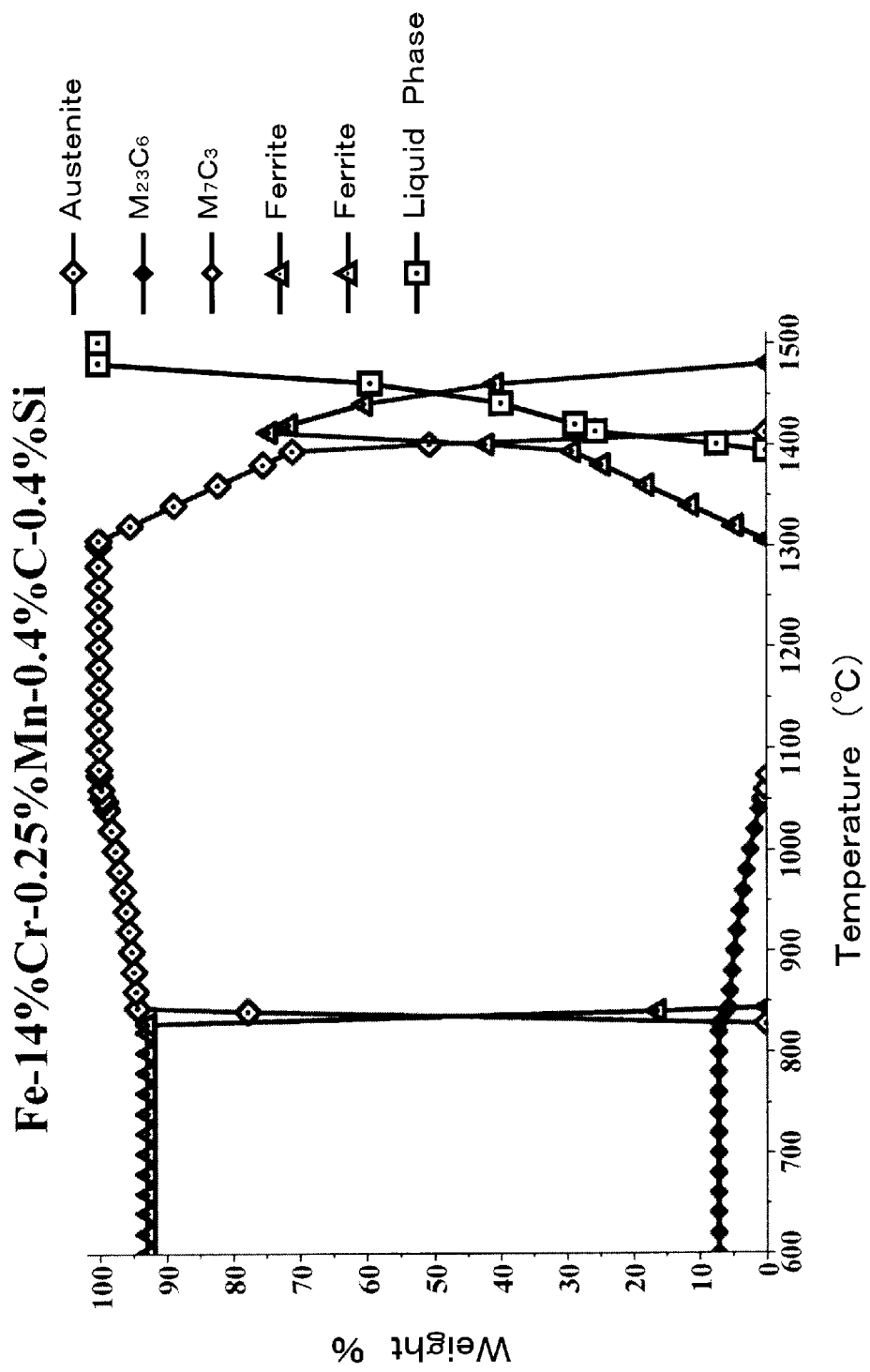
FIG. 4 is a diagram showing amounts of precipitated carbide in stainless steel of the martensite type.

The mechanism of the precipitation of the intermetallic compounds according to the heat treatments will be explained hereinafter. In stainless steels of the martensite type (Fe-14 wt %Cr-0.25 wt %Mn-0.4 wt %C-0.4 wt %Si), according to thermodynamic calculations, as shown in FIG. 4, the carbide phase equilibrated with the ferrite phase changes into a Cr rich phase such as $M_{23}C_6$ from $M_7C_3$ (850° C.) according to the Cr content in the steel, and $M_{23}C_6$ will be the equilibrium carbide phase. For example, in the case of the stainless steel in Example 1 (SUS420J2), after the matrix is transformed to the austenite phase by a solution heat treatment in which the steel is maintained at around 1300° C., carbide particles are precipitated by maintaining the steel at 840° C., and the carbide particles are then transformed into stable $M_{23}C_6$ by maintaining the steel at 780° C. Particularly in the case of stainless steels of the martensite type or the ferrite type, Cr is diffused into or around primary precipitated carbide particles, so that stable and relatively large carbide particles with sizes of a few $\mu$m is precipitated.

TABLE 1

| | Material | First Heat Treatment | Second Heat Treatment | Acid Treatment | Carbon/Metal | | Metal/Metal | |
|---|---|---|---|---|---|---|---|---|
| | | | | | Initial Contact Resistance (m$\Omega \cdot$cm$^2$) | Contact Resistance after Deterioration (m$\Omega \cdot$cm$^2$) | Initial Contact Resistance (m$\Omega \cdot$cm$^2$) | Contact Resistance after Deterioration (m$\Omega \cdot$cm$^2$) |
| Example 1 | SUS420J2 | Maintaining at 1300° C. | Maintaining at 780° C. | Done | 20~50 | 40~50 | 1~3 | 0~15 |
| Example 2 | SUS410 | Maintaining at 1300° C. | Maintaining at 780° C. | Done | 20~50 | 70~90 | 1~3 | 15~20 |
| Example 3 | SUS440 | Maintaining at 1300° C. | Maintaining at 600° C. | Done | 20~50 | 70~95 | 1~3 | 30~50 |
| Example 4 | SUS304 | Rapid Cooling from 1050° C. | Maintaining at 800° C. | Done | 20~50 | 90~110 | 1~3 | 30~50 |
| Example 5 | SUS316 | Rapid Cooling from 1050° C. | Maintaining at 800° C. | Done | 20~50 | 90~110 | 1~3 | 30~50 |
| Comparative Example 1 | SUS420J2 | Maintaining at 1300° C. | Rapid Cooling from 750° C. | None | 50~70 | 200~300 | 1~3 | 180~200 |
| Comparative Example 2 | SUS410 | Maintaining at 1300° C. | Rapid Cooling from 750° C. | None | 50~70 | 200~300 | 1~3 | 180~200 |
| Comparative Example 3 | SUS440 | Maintaining at 1300° C. | Maintaining at 600° C. | None | 50~70 | 200~300 | 1~3 | 180~200 |
| Comparative Example 4 | SUS304 | Rapid Cooling from 1050° C. | None | None | 50~70 | 200~300 | 1~3 | 180~200 |
| Comparative Example 5 | SUS316 | Rapid Cooling from 1050° C. | None | None | 50~70 | 200~300 | 1~3 | 180~200 |
| Comparative Example 6 | SUS420J2 | Maintaining at 1300° C. | Maintaining at 780° C. | None | 50~70 | 200~300 | 1~3 | 180~200 |
| Comparative Example 7 | SUS410 | Maintaining at 1300° C. | Maintaining at 780° C. | None | 50~70 | 200~300 | 1~3 | 180~200 |
| Comparative Example 8 | SUS440 | Maintaining at 1300° C. | Maintaining at 500° C. | None | 50~70 | 200~300 | 1~3 | 180~200 |
| Comparative Example 9 | SUS304 | Rapid Cooling from 1050° C. | Maintaining at 800° C. | None | 50~70 | 200~300 | 1~3 | 180~200 |

Figure 5:
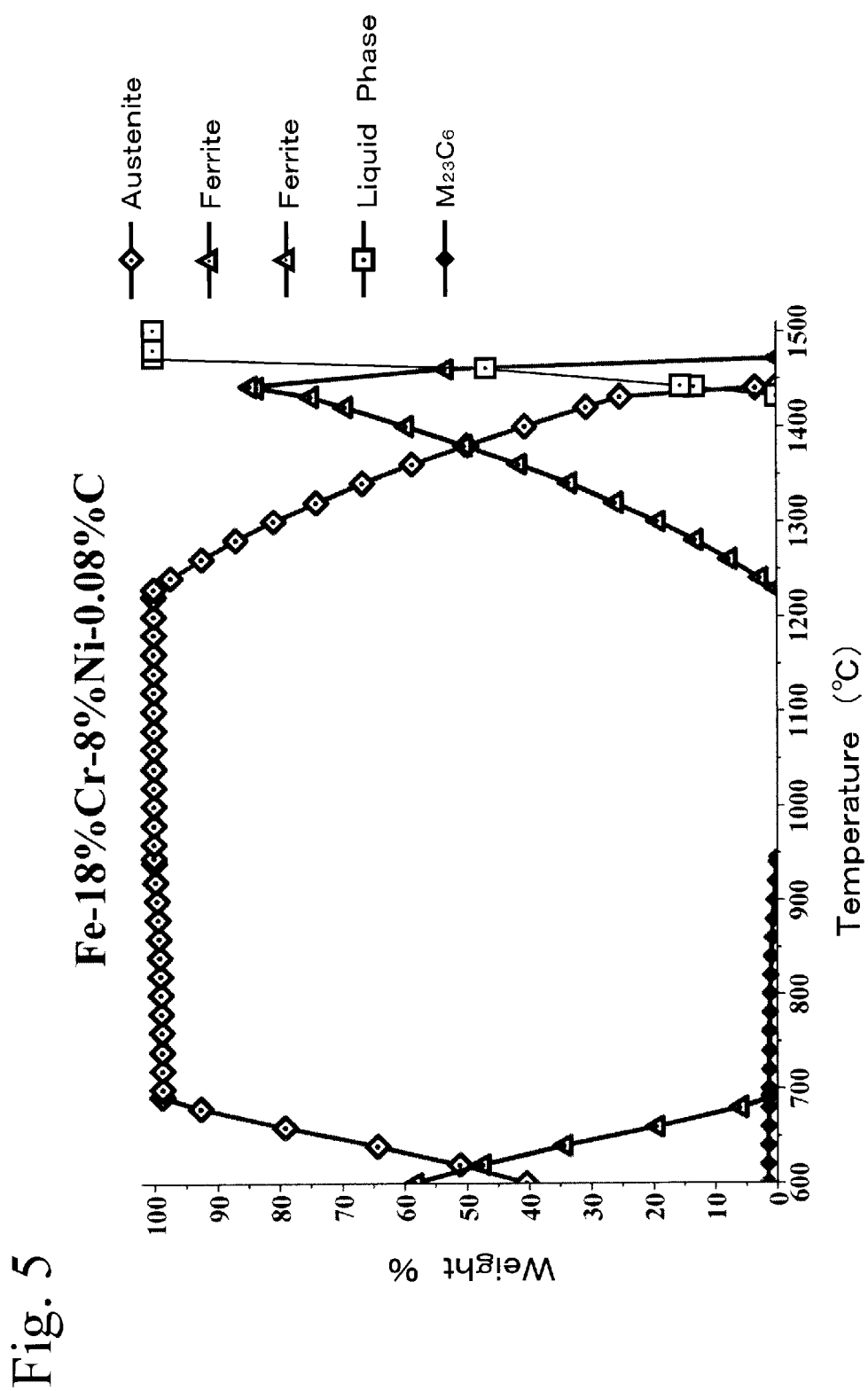
FIG. 5 is a diagram showing amounts of precipitated carbide in stainless steel of the austenite type.

The first heat treatment is a solution heat treatment, in which the stainless steel is maintained at a predetermined temperature so as to convert the metallic structure into austenite, and is cooled thereafter. In the second heat treatment, the stainless steel is maintained at a predetermined temperature for a predetermined time so as to precipitate intermetallic compounds. In the acid treatment applied to Examples 1 to 5, the stainless steel is dipped into a mixed solution of ferric sulfate and sulfuric acid (ferric sulfate: 5 to 10%, sulfuric acid: 25 to 30%) at 80° C. for 5 minutes so as to dissolve the surface matrix of the stainless In stainless steels of the austenite type (Fe-18 wt %Cr-8 wt %Ni-0.08 wt %C), according to thermodynamic calculations, as shown in FIG. 5, the carbide phase, which is stable $M_{23}C_6$ and equilibrated with the austenite phase, precipitated from around 825° C. For example, in the case of the stainless steel in Example 4 (SUS304), after a solution heat treatment, $M_{23}C_6$ is precipitated primarily at the grain boundary of austenite, and is dispersed in the austenite phase.

It should be noted that $M_7C_3$ and $M_{23}C_6$ are intermetallic compounds consisting of a carbide including Cr as a primary component and Fe, and M means (Cr, Fe). In the intermetallic compounds, Cr—C is the main structure in crystal structure, but carbide structures of a mixture of Fe in which trace Fe is contained are included therein.

The initial contact resistance is the value which is measured in the metallic plate as obtained. The contact resistance after deterioration is the value which is measured after intentionally deteriorating it by dipping the sample into a sulfuric acid solution of pH 3 maintained at a temperature of 90° C. for 1000 hours.

Figure 6:
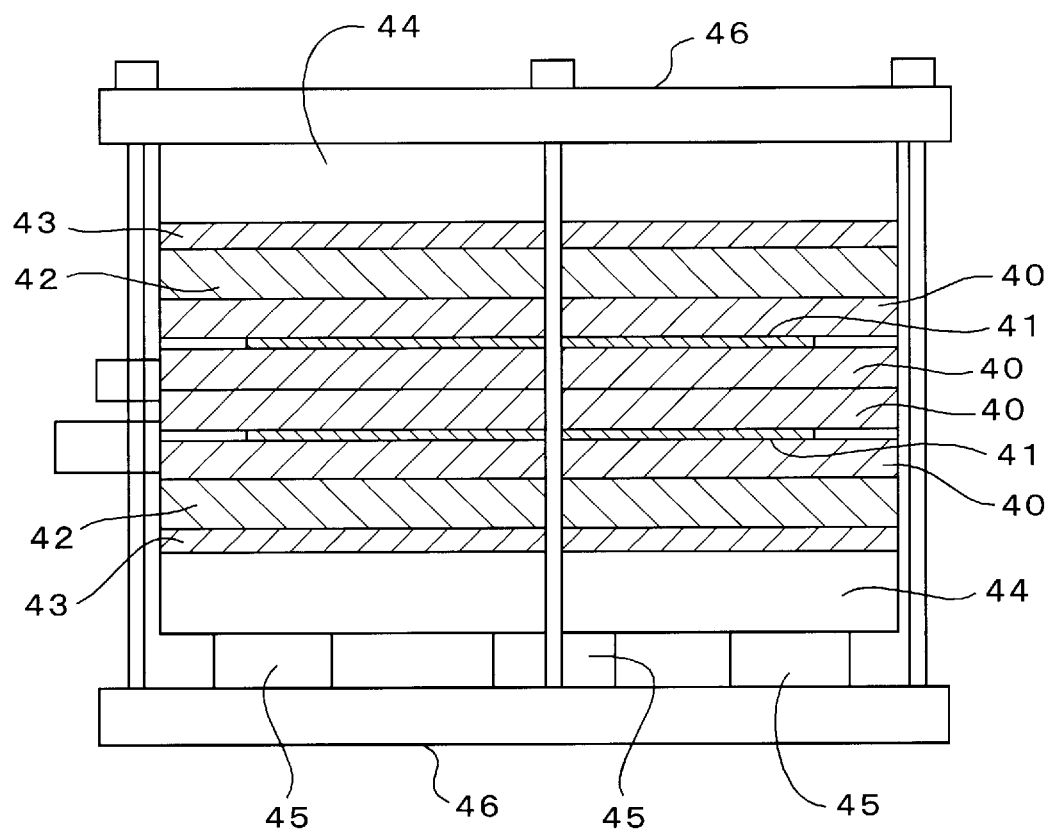
FIG. 6 is a vertical cross section of a measuring apparatus for contact resistance.

FIG. 6 is a measuring apparatus for contact resistance in the metallic plate. In the measuring apparatus, two stacked sheets of samples 40 of the metallic plates are held by carbon plates 41 to form a sample stack. A terminal plate 42, an insulating plate 43, and a holding plate 44 made from a metal are stacked on both surfaces of the sample stack, in this order, and this structure is clamped between securing plates 46 by pressing with pistons 45 of the gas pressing type. One of the terminal plates 42 is a positive electrode and the other is a negative electrode, and electricity is supplied to the electrodes from a constant current supply. In the measurement, voltage A between the stacked samples 40 and voltage B between the samples 40 holding the carbon plate 41 were measured and the resistances were calculated. The resistance calculated from the voltage A is the contact resistance between the samples 40 (between the metals), and the resistance calculated from the voltage B is the contact resistance between the sample 40 and the carbon.

As is clearly shown in Table 1, in Examples 1 to 5 in which intermetallic compounds are projected by the acid treatment, the initial contact resistance and the contact resistance after deterioration were small, and it was confirmed that good electrical conductivity was obtained. In contrast, in the comparative examples, although the initial contact resistances in Comparative Examples 6 to 9 were approximately the same as that of the examples, the contact resistances after deterioration in all the comparative examples were greatly increased, and it was demonstrated that these are not suitable for longterm use.

What is claimed is:

1. A separator for a fuel cell comprising a plate-shaped electrode having a pair of gas diffusion electrode plates and an electrolytic layer held by the gas diffusion electrode plates;

the separator being layered on both surfaces of the electrode and forming gas passages cooperating with the gas diffusion electrode plate;

the separator comprising:

a metallic plate;

protrusions, which are affixed to the metallic plate made from a carbon-based material, the protrusion having a projected surface projecting from the metallic plate toward the gas diffusion electrode plate so as to contact therewith and to form the gas passages;

intermetallic compounds precipitated on the projected surface of the protrusion; wherein the gas passage is formed by a surface of the metallic plate and a pair of side surfaces of adjoining protrusions.

2. A separator for a fuel cell according to claim 1, wherein the metallic plate includes through holes, and the protrusion engages with the through hole.

3. A separator for a fuel cell according to claim 2, wherein the protrusion is integrally formed with the through hole.

4. A separator for a fuel cell according to claim 1, wherein the intermetallic compounds are Fe-Cr carbides.

5. A separator for a fuel cell according to claim 4, wherein the intermetallic compounds are precipitated in the metallic plate by a heat treatment after a solution heat treatment, and project from the surface of the metallic plate by subjecting the-metallic plate to an acid treatment.

* * * * *

UNITED STATES PATENT AND TRADEMARK OFFICE
CERTIFICATE OF CORRECTION

PATENT NO.    : 6,670,066 B2
DATED         : December 30, 2003
INVENTOR(S)   : Makoto Tsuji et al.

It is certified that error appears in the above-identified patent and that said Letters Patent is hereby corrected as shown below:

Title page,
Item [75], Inventors, please correct the third inventor's name from "Teruyuji Ohtani" to -- Teruyuki Ohtani --.

Signed and Sealed this

Twenty-second Day of June, 2004

JON W. DUDAS
*Acting Director of the United States Patent and Trademark Office*